United States Patent
Afshari

(10) Patent No.: US 8,832,859 B2
(45) Date of Patent: Sep. 9, 2014

(54) PROBE ALIGNMENT TOOL FOR THE SCANNING PROBE MICROSCOPE

(75) Inventor: Ali R. Afshari, Fremont, CA (US)

(73) Assignee: Ali R. Afshari

(*) Notice: Subject to any disclaimer, the term of this patent is extended or adjusted under 35 U.S.C. 154(b) by 216 days.

(21) Appl. No.: 12/998,126

(22) PCT Filed: Sep. 18, 2008

(86) PCT No.: PCT/US2008/010843
§ 371 (c)(1),
(2), (4) Date: Mar. 18, 2011

(87) PCT Pub. No.: WO2010/033100
PCT Pub. Date: Mar. 25, 2010

(65) Prior Publication Data
US 2011/0173728 A1   Jul. 14, 2011

(51) Int. Cl.
G01Q 20/00 (2010.01)
G01Q 40/00 (2010.01)
G01Q 30/02 (2010.01)
B82Y 35/00 (2011.01)

(52) U.S. Cl.
CPC .............. *G01Q 40/00* (2013.01); *G01Q 30/025* (2013.01); *B82Y 35/00* (2013.01)
USPC ................ 850/5; 850/1; 850/2; 850/3; 850/4; 850/6; 850/7; 850/8; 850/9; 850/10

(58) Field of Classification Search
USPC .......... 850/1, 2, 3, 4, 5, 6, 7, 8, 9, 10; 73/104, 73/105
See application file for complete search history.

(56) References Cited

U.S. PATENT DOCUMENTS

| 6,057,546 A * | 5/2000 | Braunstein et al. ............. 850/15 |
| 2001/0054691 A1* | 12/2001 | Park et al. ...................... 250/309 |
| 2009/0249521 A1* | 10/2009 | Dazzi et al. ..................... 850/33 |

* cited by examiner

*Primary Examiner* — Nicole Ippolito
(74) *Attorney, Agent, or Firm* — Paul H Ware

(57) ABSTRACT

A probe alignment tool (10) for scanning probe microscopes utilizes an attached relay optics to view the scanning probe microscope probe tip (40) and align its image in the center of the field of view of an optical microscope (36). Adjustments to optical microscope motorized stages (50) and (60) along with adjustments of scanning probe microscope stages (44), (46) and (58) allow determination of a path and distance from the center of the field of view to the probe tip (40). From such determination a target area to be examined by the scanning probe microscope may be positioned precisely and accurately under the probe tip (40). Replacement of a scanning probe microscope probe tip (40) in an atomic force microscope unit (42) may be accomplished without the loss of alignment measurements.

9 Claims, 6 Drawing Sheets

PROBE ALIGNMENT TOOL FOR THE SCANNING PROBE MICROSCOPE

TECHNICAL FIELD

This invention relates to scanning probe microscope systems. The invention is, however, more particularly directed to apparatus and methods for alignment and positioning of scanning probe microscope probe tips.

BACKGROUND ART

The scanning probe microscope is a general term referring to various mechanisms and methods in which a sample is scanned with a microscopic probe to produce much higher resolutions than can be achieved with standard optical microscopes. One common example is the atomic force microscope, also known as the scanning force microscope that scans a sharp stylus attached to a flexible spring lever, commonly called a cantilever, over a sampled surface. This very high resolution atomic force microscope has a demonstrated resolution of fractions of a nanometer more than one thousand times better than the optical diffraction limit. The basic objective of the operation of the atomic force microscope is to measure the forces at the atomic level between a sharp probing tip and a sample surface. Surface areas of interest to be examined by the atomic force microscope are of the order of surface topographies within nanoscales or ten to the minus tenth meters. Computer programs are utilized to produce images of surface topography of samples of interest. Under normal operating conditions, an atomic force microscope tip may last for a few days, so changing a probe tip may become a regular occurrence.

The relevant prior art related to atomic force microscopes includes U.S. Pat. No. 5,705,814 to James M. Young, et al. for Scanning Probe Microscope Having Automatic Probe Exchange and Alignment, issued Jan. 6, 1998. This patent to Young, et al. points out the importance of precise and accurate alignment of probes with respect to a workpiece sample to be examined.

A U.S. Pat. No. 6,032,518, issued to Prater, et al. for Scanning Stylus Atomic Force Microscope With Cantilever Tracking and Optical Access, issued Mar. 7, 2000. This prior art patent provides important background information with respect to the operation of the atomic force microscope and further points out the importance of precise and accurate alignment of the probe tip with respect to a sample to be examined.

The U.S. Pat. No. 5,388,452, to Harp, et al. for Detection Systems for Atomic Force Microscopes, issued Feb. 14, 1995, also provides further interesting and informative background information with respect to the operations of the atomic force microscope system.

Of additional interest is U.S. Pat. No. 5,672,816, to Park, et al. for Large Stage System for Scanning Probe Microscopes and Other Instruments, issued Sep. 30, 1997. The definitions provided by this very informative document are very helpful in understanding the technology that underlies all scanning probe systems.

The U.S. Pat. No. 6,737,646 B2, to Schwartz for Enhanced Scanning Probe Microscope and Nanolithographic Methods Using the Same issued May 18, 2004, is of particular interest. In this patent document the inventor has emphasized the inclusion of optical microscopes in commercial scanning probe microscopes to help monitor the tip to sample approach and to select the areas of interest on the sample surface. In addition, the inventor has shown an application in which the sample tip may be viewed from the side by the utilization of a small right angle mirror for the optical microscope.

These prior art innovations and their methods are commendable and show a creative spirit. These prior art innovations and systems, however, do not include those elements of the instant invention that provide a long felt but unmet need in the art. None of the prior art has used the direct viewing of the probe tip itself as a means for positioning and aligning that probe tip with respect to a sample work piece of interest.

DISCLOSURE OF INVENTION

Even though the instant invention will find general applicability with respect to all types of scanning probe microscopes, it will be described primarily with respect to the atomic force microscope. Such description and explication is not intended in any way to detract from or limit the generality of the invention.

In accordance with the instant invention there is provided a method and apparatus for directly observing a probe tip and positioning said probe tip precisely and accurately with respect to a target sample workpiece of interest. It is contemplated that the instant invention will be utilized with a scanning probe optical microscope system comprising an optical microscope sub system coupled with an atomic force scanning microscope sub system and in which the optical microscope is first employed to acquire a region within which resides an area to be more minutely examined by the atomic force scanning microscope. The advantages of the invention further provide for convenient replacement and alignment positioning of probe tips in the atomic force scanning probe microscope sub system.

BRIEF DESCRIPTION OF DRAWING

Further advantages and features of the instant invention will be more fully apparent to those skilled in the art to which the invention pertains from the ensuing detailed description thereof regarded in conjunction with the accompanying drawing wherein like reference numerals apply to like parts throughout and in which.

ABSTRACT OF THE DRAWING

Figure 1:
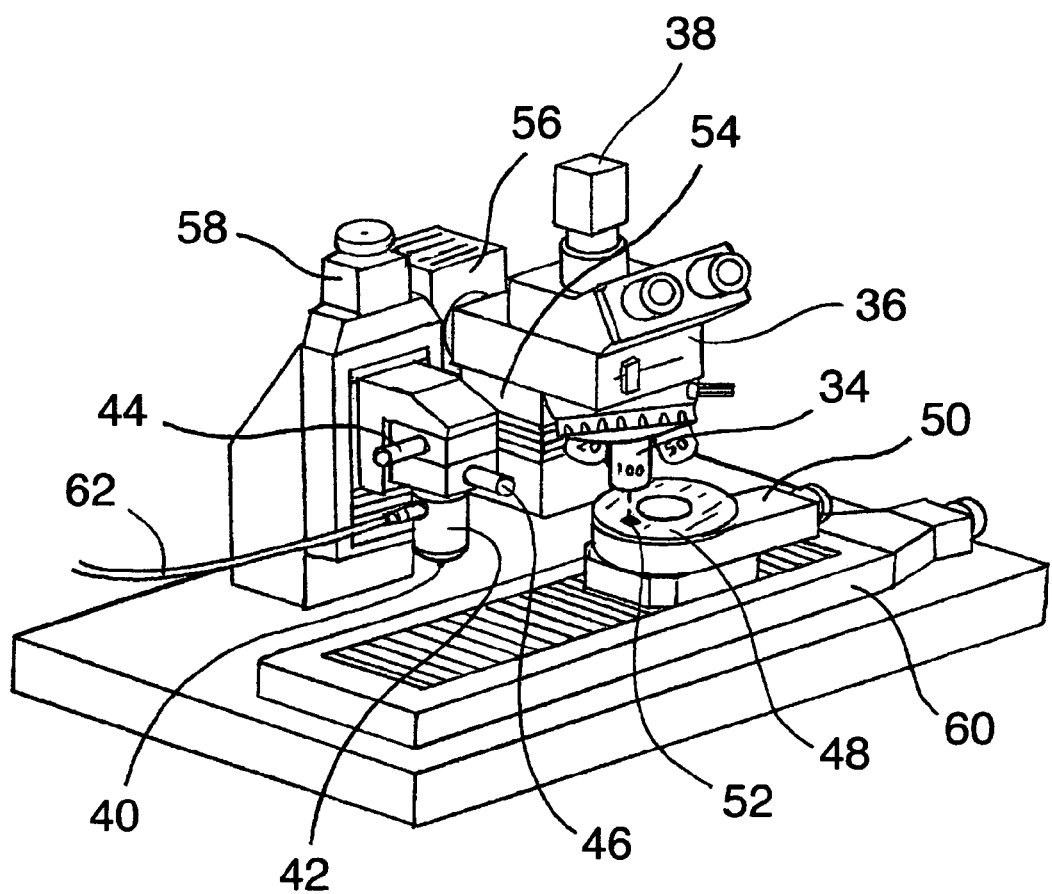
FIG. 1. is a perspective illustration showing a test target area of a sample workpiece set up for observation by an optical microscope and a CCD camera.

In the drawing, the numerals refer to like parts throughout and, for the purpose of explication, set forth below are the numbered parts of the names of the elements of this invention.

| IDENTIFYING NUMERAL | NAME OF ELEMENT | SHOWN IN FIGS. |
|---|---|---|
| 10 | Alignment tool generally | 3, 4, 5, 6 |
| 12 | Alignment tool relay objective 1 | 3, 4, 5, 6 |
| 14 | Fold mirror 1 with tilt adjustment | 3, 4 |
| 16 | Fold mirror 2 with tilt adjustment | 3, 4 |
| 18 | Alignment tool relay objective 2 | 3, 4, 5 |
| 20 | Fold mirror alignment screws | 3, 4 |
| 22 | Alignment tool Y-axis adjustment screw | 4, 5 |
| 24 | Alignment tool fixed carriage | 4 |
| 26 | Stage mounting bores | 4 |
| 28 | Alignment tool fixed optical axis | 4, 5 |
| 30 | Alignment tool's horizontal optical axis | 3, 4 |
| 32 | Alignment tool X-axis adjustment screw | 4, 5 |
| 34 | Selected objective on microscope turret | 1, 2, 3, 5, 6 |
| 36 | Optical Microscope | 1, 3 |
| 38 | CCD camera | 1, 3, 5, 6 |
| 40 | AFM tip or probe | 1, 3, 6 |
| 42 | AFM unit | 1, 3, 5, 6 |
| 44 | AFM X-axis alignment stage | 1, 2, 3, 5, 6 |
| 46 | AFM Y-axis alignment stage | 1, 2, 3, 5, 6 |
| 48 | Sample disc work piece | 1, 5 |
| 50 | Y-axis and rotary motorized stage | 1, 2, 5 |
| 52 | Work piece area of interest | 1 |
| 54 | Microscope focusing stage | 1 |
| 56 | Lamp housing | 1, 5 |
| 58 | AFM engage/disengage stage | 1, 5 |
| 60 | X-axis and linear motorized stage | 1, 2, 5, 6 |
| 62 | AFM electrical cable | 1, 6 |
| 64 | Alignment tool Y-axis anvil | 4, 5 |
| 66 | AFM head mounting platform | 3, 6 |
| 68 | AFM dovetail mount | 6 |
| 70 | Alignment tool Y-stage return spring | 4 |
| 72 | AFM tip changing station | 6 |
| 74 | Alignment tool X-stage guide rails | 4 |
| 76 | Alignment tool X-stage return spring | 4 |
| 78 | Alignment tool adjustable X-stage | 4 |
| 80 | Alignment tool Y-axis rotary bearing | 4 |

BEST MODE FOR CARRYING OUT THE INVENTION

Figure 3:
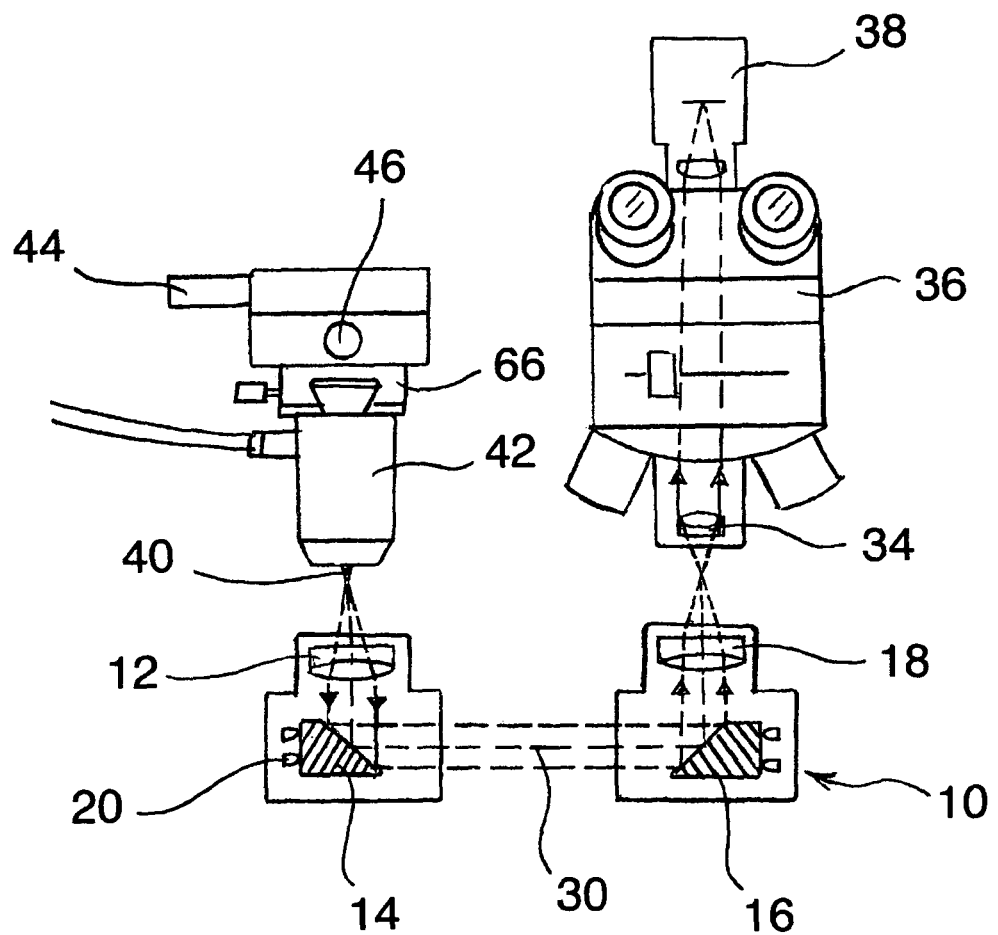
FIG. 3. is a schematic drawing showing the optical path in the probe alignment tool for the scanning probe microscope by means of which the scanning probe microscope's probe tip can be directly observed by means of an associated optical microscope and a CCD camera.
Figure 4:
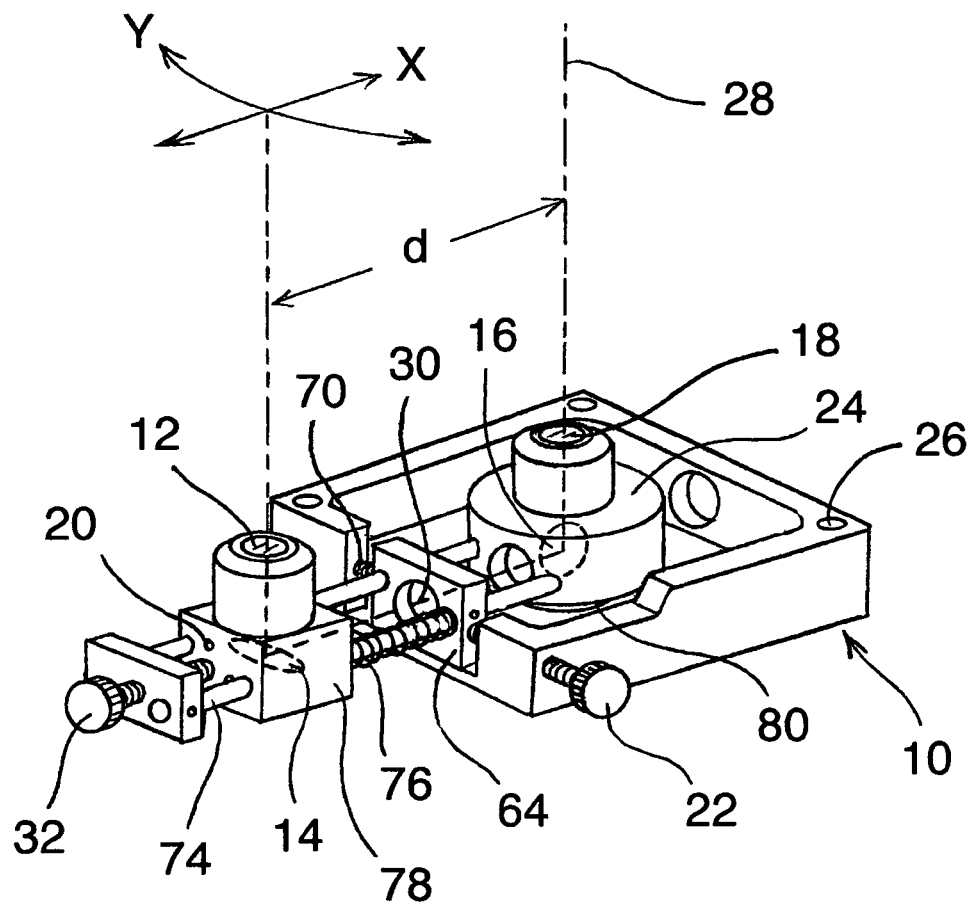
FIG. 4. is a perspective drawing of the probe alignment tool or apparatus utilized in order to determine a precise and accurate path distance, d, from its position under the optical microscope to its desired position under the scanning probe microscope probe tip of a sample work piece.
Figure 5:
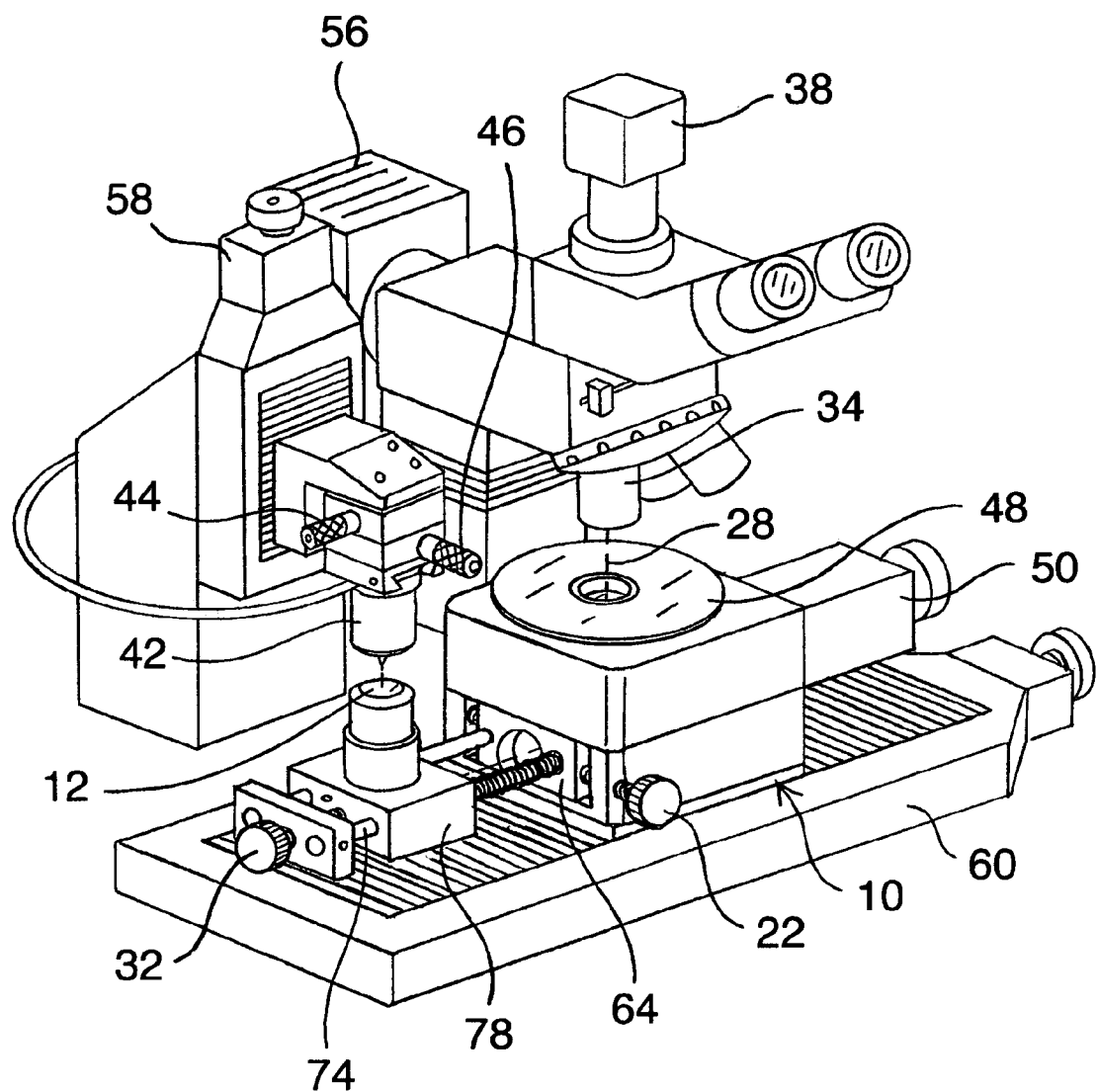
FIG. 5 is a perspective depiction presenting a detailed view of the probe alignment tool as integrated within a scanning probe-optical microscope system.

Referring to the drawing and to FIGS. 3, 4 and 5 with greater particularity, an initial set-up of alignment tool 10 may be explained. Alignment tool 10 comprises a relay optic that projects the frontal, as opposed to side or profile, image of atomic force microscope probe tip 40 to an observer, for example, to the focal point of microscope objective 34 of optical microscope 36 for direct human observation or perhaps concurrently to the sensory facilities of a CCD camera, 38, for display on a monitor, not shown. The optical design of alignment tool 10 includes two microscope objectives, 12 and 18 and two adjustable fold mirrors, 14 and 16. First objective 12 projects an image of probe tip 40 to selected objective 34 on the turret of optical microscope 36 by way of first fold mirror 14 to second fold mirror 16 and alignment tool relay second objective 18. Fold mirror tilt adjustment screws 20 provide for adjustment of the fold mirrors 14 and 16 respectively. Mounting bores 26 are utilized for mounting the alignment tool 10 between the rotary stage 50 and linear stage 60. During an initial setup procedure, path and distance information data, d, are registered on the alignment tool 10 by means of X-axis adjustment screw 32 and Y-axis adjustment screw 22.

Alignment tool adjustable carriage, serving as mechanical mounting structure for first fold mirror 14 and first objective 12, is denoted by numeral 78, while the alignment tool fixed carriage, serving as mechanical mounting structure for second fold mirror 16 and second objective 18, is denoted by numeral 24. Fixed carriage 24 is secured in position by rotary bearing 80 to maintain its axial position. Numeral 28 denotes this fixed axis of the alignment tool which coincides with the optical axis of the relay optics objective 18. Guide rails 74 provide structural connection and permit the adjustment of the path and distance, d, in the X direction by means of the fine thread first thumb screw 32 which pushes against the adjustable carriage 78. The centering of alignment tool in the Y direction is performed via second thumb screw 22 which pushes against the anvil 64, causing its rotation about the fixed axis 28. Two compression springs, 70 and 76 apply opposing force against thumb screws 22, and 32 respectively, and to provide zero backlash adjustments. The optical path 30 inside alignment tool 10 can be further adjusted to be exactly in alignment with both the optical microscope 36 and the atomic force microscope probe tip 40 by adjusting tilt adjustment screws 20 controlling each fold mirror 14 and 16.

Once these adjustments have been completed, cantilever tip 40 may be directly observed frontally by means of optical microscope 36. Illumination from lamp source 56 is directed by the same relay optics to the cantilever probe tip 40. All the microscope functions designed to observe features of the sample, such as high resolution objectives, change of magnification, contrast and depth-of-field adjustments become available for examining the cantilever tip.

Figure 2:
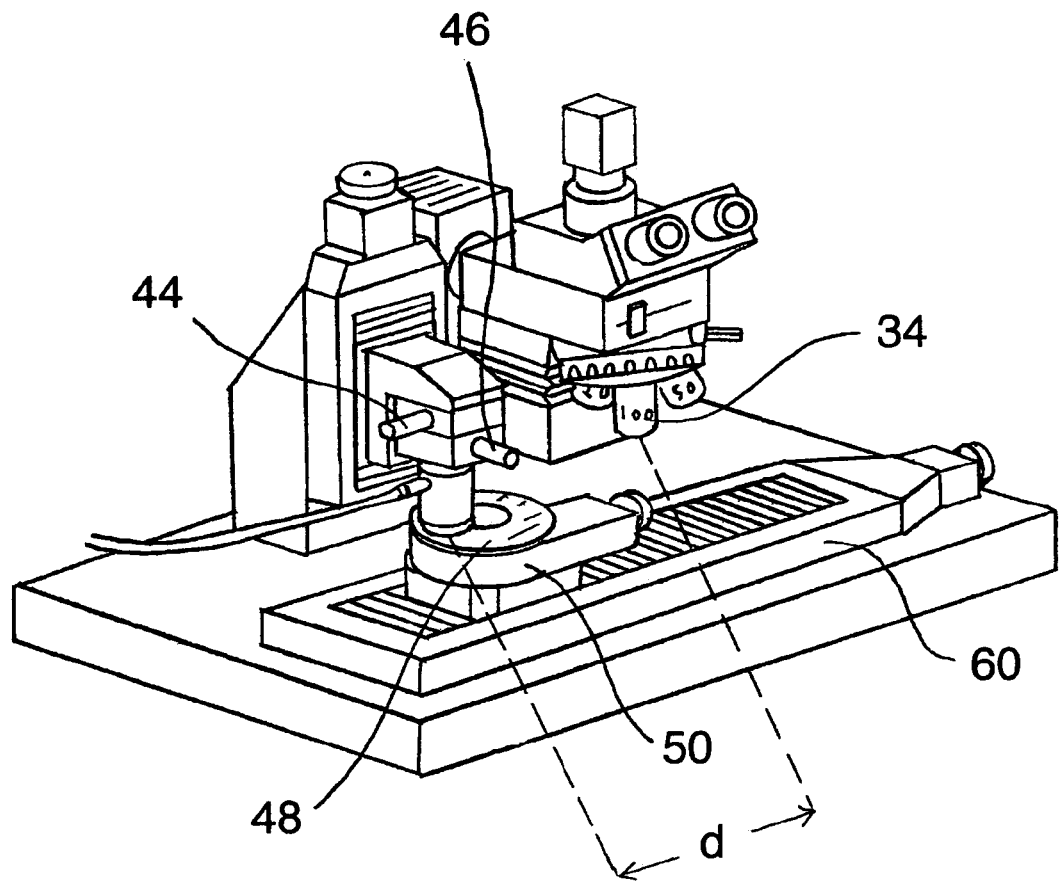
FIG. 2. is a perspective drawing showing the test target translated a path distance, d, by means of a transfer stage to a desired position with respect to the scanning probe microscope.

Referring now to FIGS. 1 and 2 with greater particularity, a test target area of interest 52 is shown as a part of a workpiece disc 48 which may be positioned under the inspection microscope 36 by way of rotary stage 50 and linear stage 60. Any point on the disc can be observed by way of radius and angle coordinates r and theta. During atomic force microscope scanning operations, a computer program translates the test target area of interest 52, the predetermined path and distance, d, to beneath atomic force microscope probe tip 40. Atomic force microscope head 42 is moved in a vertical direction downward by separate motorized stage 58 to slowly lower the probe tip into position to commence scanning of the disc surface's target area 52.

Atomic force microscope probe tips may require replacement when the tip has become either worn beyond use or broken. Such probe tips are attached to a flexible spring lever, commonly called a cantilever. In almost all cases replacement of the entire cantilever is required. Alignment tool 10 can be used to replace the cantilever carrying an atomic force microscope probe tip.

Figure 6:
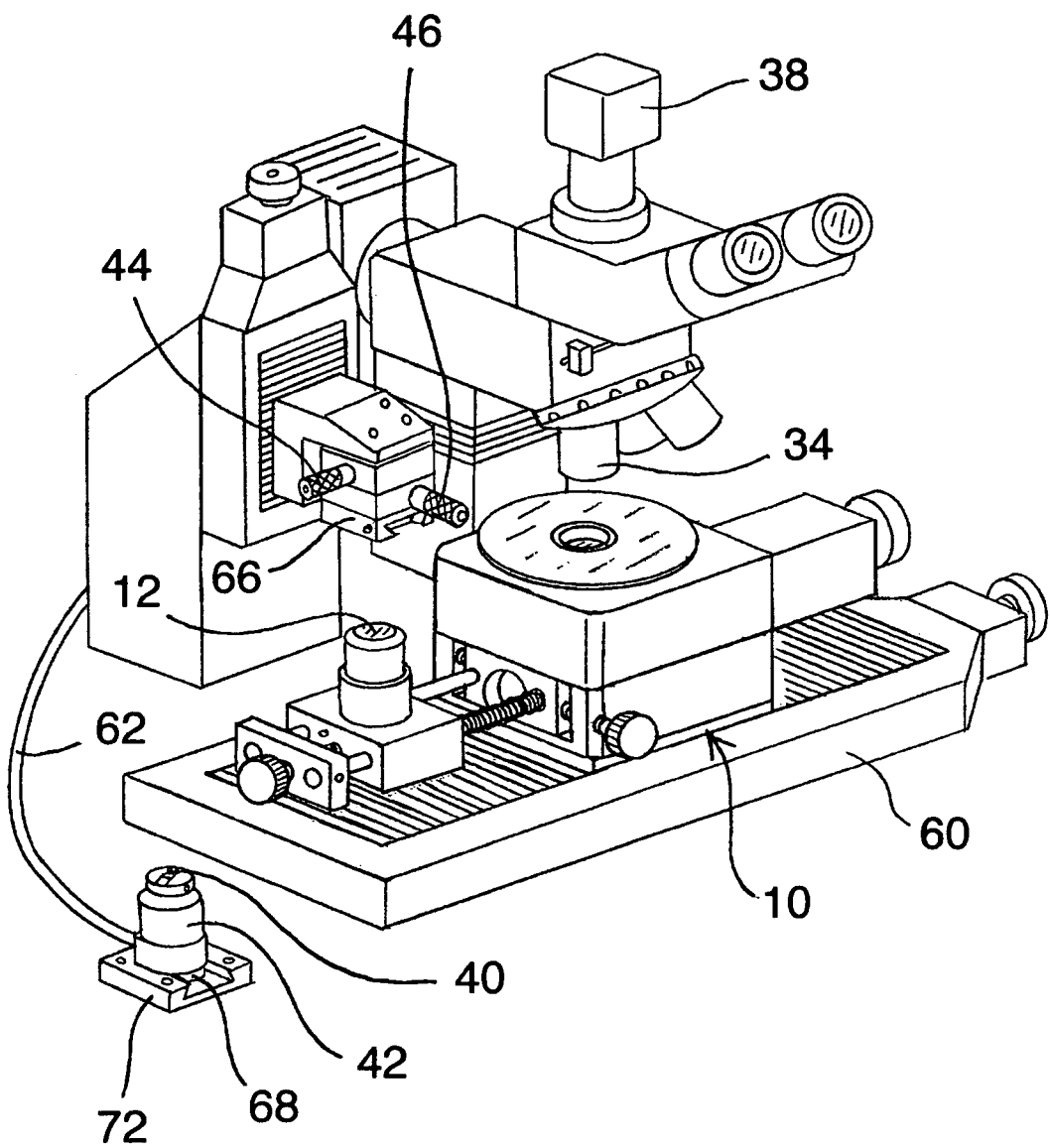
FIG. 6 is a perspective illustration of the scanning probe microscope system during normal use, and providing for scanning probe microscope probe tip replacement.

Replacing the cantilever carrying an atomic force microscope probe tip, commonly called a cantilever probe tip, that has become contaminated or worn becomes an optical alignment task which is made possible by first centering the tip on a crosshair through the main optical microscope 36, or preferably by viewing the image from CCD camera 38 on a computer screen, not shown. An advantageous feature of the invention is that it allows magnification change to view the tip and to utilize the crosshair of the optical microscope at any magnification that is available and convenient for realignment. The AFM unit 42, carrying cantilever probe tip 40, is then detached from its holder, AFM head mounting platform 66 and placed on AFM tip changing station 72 (FIG. 6) so that the cantilever probe can be replaced with a new one. A dovetail mount 68 aids in cantilever probe replacement and reinstallation of AFM unit 42 back to the AFM head mounting platform 66 with reasonable accuracy. The new cantilever probe tip may now be viewed through the optical microscope and may be centered with the crosshair, this time using X and Y stages 44 and 46 for fine adjustment.

The X-Y stages 44 and 46 maintain the position of the platform 66 and should not be altered until after a tip replacement. Prior to tip replacement, the centering of the cantilever probe tip on the crosshair of the optical microscope is accomplished by two adjustments. The first adjustment to effect positioning first objective 12 in the Y-direction via adjustment screw 22 (FIGS. 4 and 5), while rotary-bearing 80 keeps second objective 18 centered below the microscope objective 34. This rotational adjustment of the alignment tool 10 is essential because its horizontal optical axis 30 (FIG. 3, 4) must be made to be precisely in line with the translational path of linear stage 60 (FIG. 5). The second fine adjustment translates first objective 12 in the X-direction to adjust for the distance d (FIGS. 4 and 5) by means of fine adjustment screw 32. Both of these adjustments are necessary since switching the microscope objective 34 to another magnification can cause a shift in the image position of cantilever tip 40 on the CCD camera 38 and in the viewfinder of microscope 36.

In order to replace a broken rather than merely worn cantilever probe tip, since now the visual position of the probe tip has been lost; the alignment procedure for this case must rely on the prior adjustment and set-up of the alignment tool. The atomic force microscope probe tip unit 42 is simply removed and the tip is replaced (FIG. 6) and aligned through the main optical microscope 36, or CCD camera 38 via a cross hair on a computer screen. Since the AFM head has been moved from its aligned position, the optical alignment tool can be utilized to re center the cantilever probe tip on the crosshair through the microscope. This position is the alignment reference point for all tip alignments, and it is true for a selected objective 34. Switching to another objective may alter this alignment depending on how well the microscope itself is optically aligned for each of its objectives.

INDUSTRIAL APPLICABILITY

The present invention finds application wherever the need arises for replacement of the scanning probe in scanning probe microscopes and also when it becomes necessary during scanning operations to position the probe tip accurately and precisely.

The invention claimed is:

1. A probe alignment tool for the scanning probe microscope, comprising: a relay optic that projects the frontal image of a scanning probe microscope probe tip to an observer; and a scanning probe microscope tip changing station, said relay optic comprising:
   a first objective for acquiring the image of a scanning probe microscope probe tip and transmitting that image;
   fold mirrors for receiving, and transmitting that image by way of an optical path;
   a second objective for receiving the transmitted image from said fold mirrors and furnishing the image to an observer.

2. The probe alignment tool of claim 1 wherein the observer is the focal point of a microscope objective of an optical microscope and said relay optic comprises:
   a first objective for acquiring the image of a scanning probe microscope probe tip and transmitting that image;
   a first fold mirror for receiving the transmitted image from said first objective and transmitting that image;
   a second fold mirror for receiving the transmitted image from said first fold mirror by way of an optical path, said optical path providing optical communication between said first fold mirror and said second fold mirror and said second fold mirror transmitting the image;
   a second objective for receiving the transmitted image from said second fold mirror and furnishing the image to an observer;
   an adjustable carriage providing support for said first objective and said first fold mirror;
   a fixed carriage providing support for said second objective and said second fold mirror; and
   guide rails structurally connecting said adjustable carriage and said fixed carriage.

3. The probe alignment tool of claim 2, wherein said first fold mirror for receiving the transmitted image from said first objective and transmitting that image may be adjusted in position by means of fold mirror alignment screws;
   said second fold mirror for receiving the transmitted image from said first fold mirror may be adjusted by means of fold mirror adjustment screws; and
   said adjustable carriage may be adjusted along said guide rails in the X direction by means of a first thumb screw and in the Y direction by means of a second thumb screw.

4. The probe alignment tool of claim 1 wherein the observer is the sensory facilities of a CCD camera and said relay optic comprises:
   a first objective for acquiring the image of a scanning probe microscope probe tip and transmitting that image;
   a first fold mirror for receiving the transmitted image from said first objective and transmitting that image;
   a second fold mirror for receiving the transmitted image from said first fold mirror by way of an optical path, said optical path providing optical communication between said first fold mirror and said second fold mirror and said second fold mirror transmitting the image;
   a second objective for receiving the transmitted image from said second fold mirror and furnishing the image to an observer;
   an adjustable carriage providing support for said first objective and said first fold mirror;
   a fixed carriage providing support for said second objective and said second fold mirror; and
   guide rails structurally connecting said adjustable carriage and said fixed carriage.

5. The probe alignment tool of claim 4, wherein said first fold mirror for receiving the transmitted image from said first objective and transmitting that image may be adjusted in position by means of fold mirror alignment screws;
   said second fold mirror for receiving the transmitted image from said first fold mirror may be adjusted by means of fold mirror adjustment screws; and
   said adjustable carriage may be adjusted along said guide rails in the X direction by means of a first thumb screw and in the Y direction by means of a second thumb screw.

6. The probe alignment tool of claim 1 wherein said scanning probe microscope tip changing station comprises a dovetail mount.

7. A probe alignment tool for the scanning probe microscope, comprising:
   a relay optic that projects the frontal image of a scanning probe microscope probe tip to an observer said relay optic comprising:
   a first objective for acquiring the image of a scanning probe microscope probe tip and transmitting that image;
   a first fold mirror for receiving the transmitted image from said first objective and transmitting that image;
   a second fold mirror for receiving the transmitted image from said first fold mirror by way of an optical path, said optical path providing optical communication between said first fold mirror and said second fold mirror and said second fold mirror transmitting the image;
   a second objective for receiving the transmitted image from said second fold mirror and furnishing the image to an observer;
   an adjustable carriage providing support for said first objective and said first fold mirror;

a fixed carriage providing support for said second objective and said second fold mirror; and guide rails structurally connecting said adjustable carriage and said fixed carriage.

8. The probe alignment tool of claim 7, wherein said first fold mirror for receiving the transmitted image from said first objective and transmitting that image may be adjusted in position by means of fold mirror alignment screws;

said second fold mirror for receiving the transmitted image from said first fold mirror may be adjusted by means of fold mirror adjustment screws; and said adjustable carriage may be adjusted along said guide rails in the X direction by means of a first thumb screw and in the Y direction by means of a second thumb screw.

9. A probe alignment tool for the scanning probe microscope, comprising:

a cantilever tip changing station comprising a dovetail mount;

a relay optic that projects the frontal image of a scanning probe microscope probe tip to an observer said relay optic comprising;

a first objective for acquiring the image of a scanning probe microscope probe tip and transmitting that image;

a first fold mirror for receiving the transmitted image from said first objective and transmitting that image;

a second fold mirror for receiving the transmitted image from said first fold mirror by way of an optical path, said optical path providing optical communication between said first fold mirror and said second fold mirror and said second fold mirror transmitting the image;

a second objective for receiving the transmitted image from said second fold mirror and furnishing the image to an observer;

an adjustable carriage providing support for said first objective and said first fold mirror;

a fixed carriage providing support for said second objective and said second fold mirror; and guide rails structurally connecting said adjustable carriage and said fixed carriage.

* * * * *